June 9, 1931.     F. B. HURT     1,809,704
STONE SPREADER
Filed Dec. 26, 1928
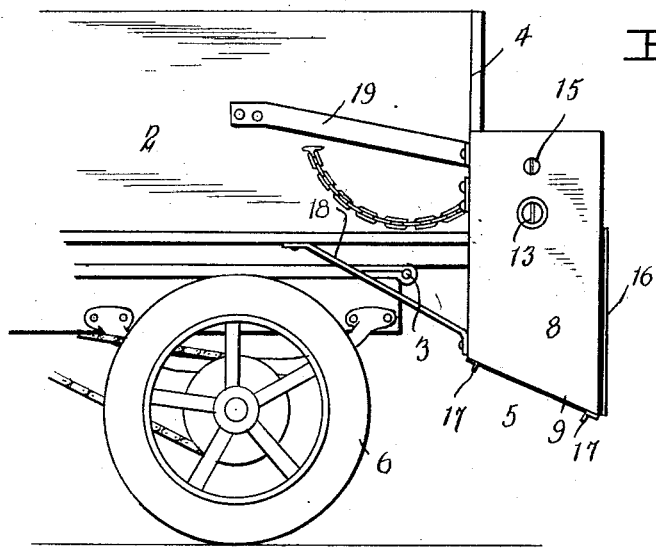
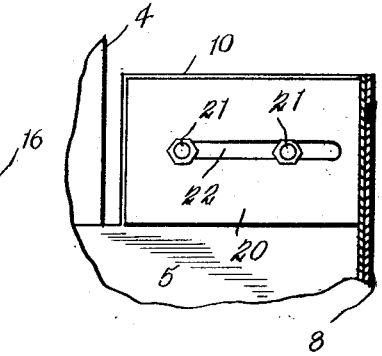
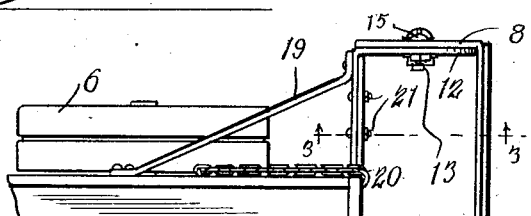
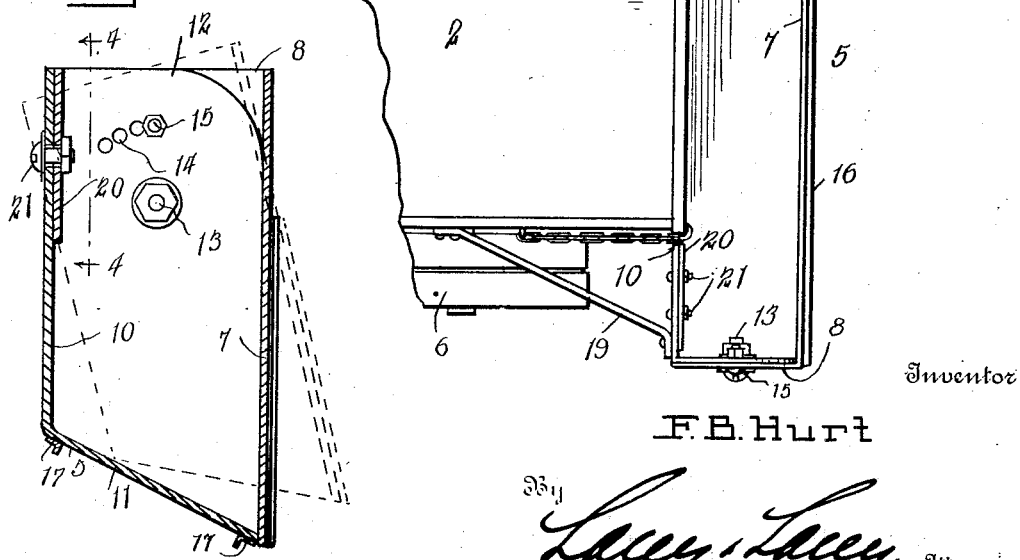
Inventor
F. B. Hurt
By Lacey & Lacey, Attorneys.

Patented June 9, 1931

1,809,704

UNITED STATES PATENT OFFICE

FRANK B. HURT, OF LA GRANDE, OREGON

STONE SPREADER

Application filed December 26, 1928. Serial No. 328,608.

This invention has reference to road-building accessories and has for its object the provision of a simple, inexpensive and efficient device whereby road material may be dumped upon a road bed and spread evenly thereover as it is discharged from a dumping truck. The invention is designed more particularly for spreading gravel and like material over freshly oiled road surfaces and it consists in certain novel features which are illustrated in the accompanying drawings and will be hereinafter first fully described and then more particularly defined in the appended claims.

The primary object of my invention is to provide means for spreading road materials by the use of a device attached to the rear end of a truck and extending laterally beyond the sides of the truck so that the material that is being spread will fall beyond the line of travel of the wheels of the truck.

A further object of my invention is to provide simple but efficient means attachable to the rear of a truck whereby the wheels of the truck will not come into contact with the binding agent that has been spread upon the road bed being surfaced with the aggregate deposited by the truck.

Still another object of my invention is to provide means for spreading road materials by the use of a simple attachment to the rear end of a truck body, the attachment extending laterally beyond the sides of the truck and being of a greater width than the truck body, in order that the road material may be deposited in advance of the wheels of the truck and make a bed for the wheels; thus preventing the wheels from coming into contact with the binding agent that has been deposited on the road being surfaced.

In the drawings:

Figure 1 is a side elevation of a portion of a dumping truck having my spreader mounted thereon, Fig. 2 is a top plan view of the same, Fig. 3 is an enlarged detail section on the line 3—3 of Fig. 2, and Fig. 4 is an enlarged detail section on the line 4—4 of Fig. 3.

The dumping truck may be of any approved type having a body or box 2 supported by hinges 3 at the rear end of the chassis or truck frame and equipped with an end gate 4 which may swing rearwardly to open position as the box or body is swung to dumping position.

In carrying out my invention, there is provided a hopper 5 which is secured to the rear end of the truck frame and projects beyond the sides of the same so that the ends of the hopper will be laterally beyond the paths of the rear truck wheels 6. The hopper comprises a rear wall 7 having end walls 8 formed therewith and extending forwardly, the lower ends of the end walls being tapered, as shown at 9. There is also a front wall 10 which is adapted to be secured to the truck frame and is formed with a rearwardly and downwardly extending floor or bottom 11 and rearwardly extending end walls 12 to which the respective end walls 8 are pivotally connected by bolts 13. Disposed concentric with each bolt 13, series of openings 14 are formed through the respective end walls 12 and a set bolt 15 may be secured through any one of said openings and an opening provided therefor in the adjacent end wall 8 so that the rear member of the hopper may be adjusted to set its lower edge at a greater or less distance from the extreme lower edge of the floor 11, as will be understood from Fig. 3. The rear wall of the hopper is reinforced by angle bars 16 extending longitudinally thereof in an obvious manner and the bottom may be likewise reinforced by angle bars 17. Bracing brackets 18 extend between the lower portion of the hopper and the sills of the truck frame and are rigidly bolted thereto, similar braces 19 being secured to the sides of the truck and the upper portion of the hopper so that the hopper will be firmly supported.

Referring more particularly to Fig. 4, it will be noted that the front wall of the hopper is cut away or recessed at its center so that the hopper may extend upwardly at the sides of the truck. Some clearance may be provided to permit free swinging of the end gate and accommodate a truck of maximum size but to prevent waste of material when the hopper is applied to a narrow truck, closures 20 are provided in the form of plates slidably mounted on the front wall of the hopper and adjustable toward the sides of the truck. Bolts 21 mounted in the hopper wall and engaged through slots 22 in the respective closures secure the latter in set positions.

When the device is to be used, the gravel, rock or other material is loaded into the truck in the usual manner and the truck, after being driven to the oiled portion of the road, is disposed so that its rear or dumping end will be located adjacent and over the end of the oiled surface. The rear member of the hopper is then adjusted so that the lower edge of the same will be set at a desired distance from the lower edge of the floor and a discharge opening of any desired width will be thus produced. The truck body is then shifted into the dumping position and the end gate released, whereupon the road material will flow into the hopper and as the hopper swings downwardly with the rear end of the truck body, the road material will be discharged through the hopper onto the road bed and will be spread laterally across the road bed to the extent permitted by the width of the hopper. The truck is then backed so that the lower edge of the floor of the hopper will ride over the dumped material and will spread the same evenly to the desired thickness, the material continuing to flow out through the hopper until the entire load is discharged. Inasmuch as the hopper extends beyond the paths of the truck wheels, the wheels will run on the gravel or other material and will not come in contact with the oiled surface to take up the oil and scatter the same upon parts of the truck or transfer the same to other portions of the road surface, results which are undesirable and which frequently occur according to the present methods of road building.

My device is exceedingly simple and may be readily attached to any dumping body truck without adding perceptibly to the draft of the same. By the use of the device, the road material may be spread rapidly and evenly so that the labor needed to repair the road is reduced and the cost likewise reduced while the work is facilitated. It will be noted that in the dumping position, the road material falls practically straight through the hopper and none of the material will stick in the bottom of the hopper.

Having thus described the invention, I claim:

1. Means for spreading road material consisting of a hopper including a front wall, end walls extending rearwardly therefrom, and a downwardly and rearwardly inclined floor connected with said front and end walls, a rear wall, end walls extending forwardly from the rear wall and disposed at the sides of the first-mentioned end walls, means for pivoting the end walls together, and means for securing the end walls in various angular relations whereby to set the lower edge of the rear wall at a desired distance from the lower edge of the floor.

2. Means for spreading road material consisting of a hopper including a front member having a floor and end walls and a rear member having a rear wall and end walls, means for pivoting the end walls of the two members together, a series of openings through the end walls of the front member concentric with the pivot, and a securing device engageable through one of said openings and through the end wall of the rear member whereby to secure the members in a set relation.

3. Means for spreading road material comprising a hopper having a front member including a front wall constructed to fit about the discharging rear end of a dumping truck body, end walls, and a rearwardly and downwardly inclined bottom, a rear member having a wall adapted to meet the rear edge of the bottom of the front member to retain road material therein, means to secure the rear member with its lower edge in spaced relation to the bottom of the front member to define a discharge opening, and means to secure the front member to the rear end of a dumping truck body in fixed relation thereto whereby as the truck is backed the front member of the hopper will spread road material evenly over the road surface.

4. Means for spreading road material comprising a hopper having a centrally recessed front wall to fit below and extend laterally beyond and upwardly at the sides of a dumping truck body, means to secure the hopper to the truck body, and closure plates mounted on the end portions of the hopper front wall and adjustable laterally with respect to the truck body whereby the space between the ends of the hopper and the sides of the truck body may be bridged and the hopper applied to truck bodies of various widths.

In testimony whereof I affix my signature.
FRANK B. HURT. [L. S.]